Jan. 8, 1952     H. P. KRONENWETTER     2,581,960
AUTOMATIC GRID CUTTING MACHINE
Filed Aug. 26, 1946     3 Sheets-Sheet 1

INVENTOR.
Harold P. Kronenwetter
BY
His Attorney

Jan. 8, 1952  H. P. KRONENWETTER  2,581,960
AUTOMATIC GRID CUTTING MACHINE
Filed Aug. 26, 1946  3 Sheets-Sheet 2
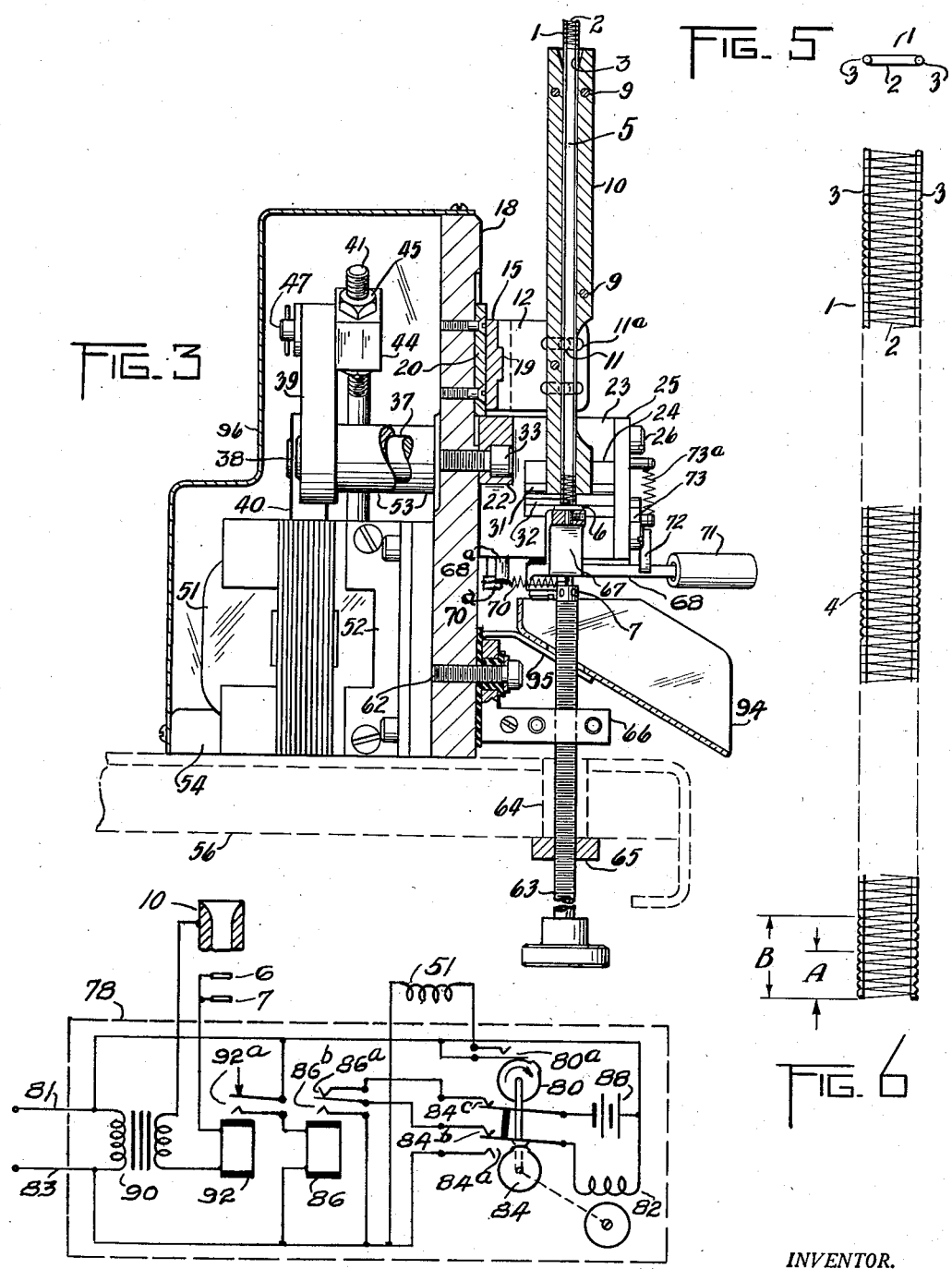
INVENTOR.
Harold P. Kronenwetter
BY
His Attorney Jan. 8, 1952     H. P. KRONENWETTER     2,581,960
AUTOMATIC GRID CUTTING MACHINE
Filed Aug. 26, 1946     3 Sheets-Sheet 3
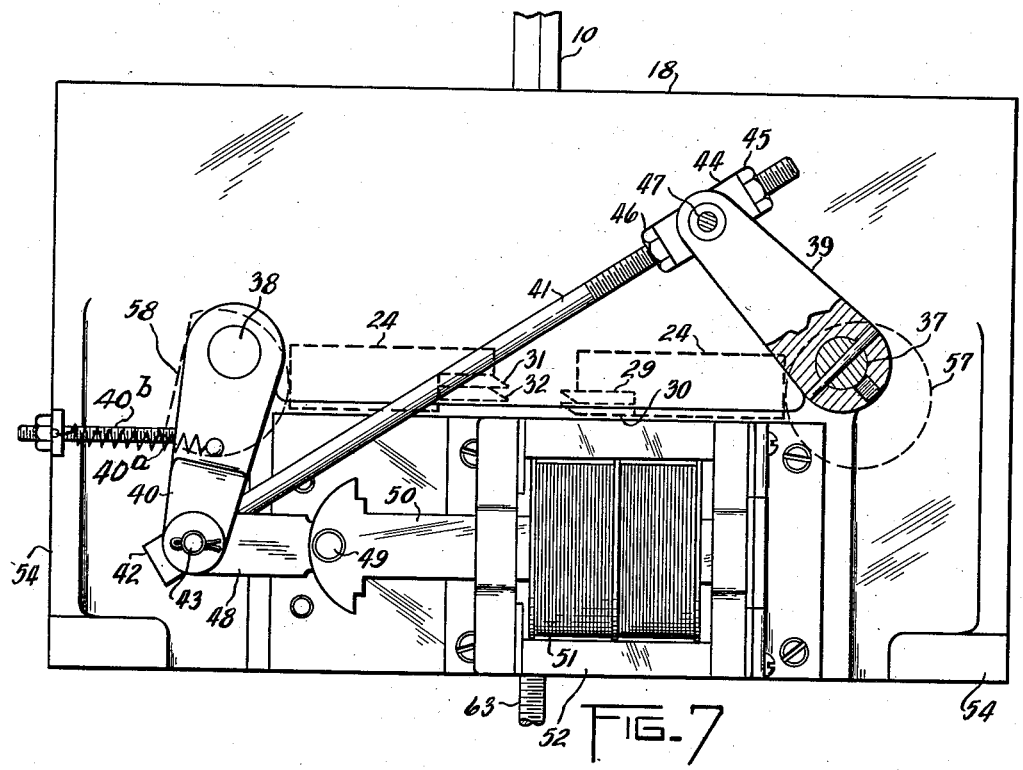
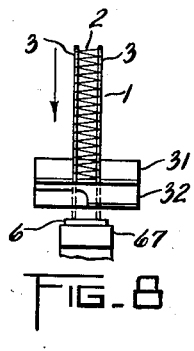
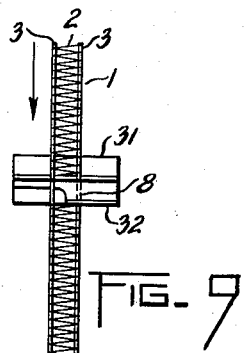
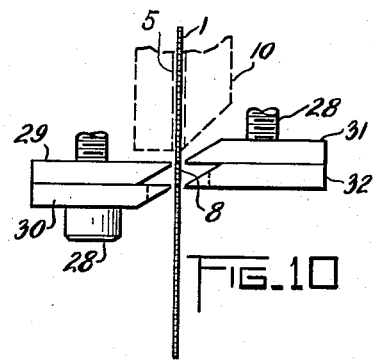
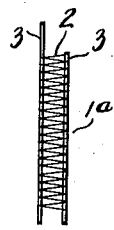
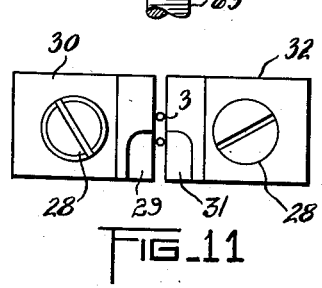
INVENTOR.
Harold P. Kronenwetter
BY Arthur H B Richardson
His Attorney Patented Jan. 8, 1952

2,581,960

UNITED STATES PATENT OFFICE 2,581,960

AUTOMATIC GRID CUTTING MACHINE

Harold P. Kronenwetter, South Park, Emporium, Pa., assignor to Sylvania Electric Products Inc., a corporation of Massachusetts Application August 26, 1946, Serial No. 693,073

9 Claims. (Cl. 164—48)

The present invention relates to cutting devices and more particularly to improvements in apparatus for cutting grids of a type commonly used in electronic tubes.

Grids of the character referred to are usually constructed of two spaced parallel rods of relatively heavy wire around which is wound an open spiral of fine wire, the successive convolutions lying in grooves formed in the side rods, in most instances, by a sharp edge operating just in advance of the wire as it is wound, these grooves alternating with ridges which by a swaging tool are laid over the transverse windings to hold them in place and add rigidity to the structure.

A method now employed for making this type of grid is to wind comparatively long strips on a grid lathe and subsequently cut the strips into unit lengths as required by the size and type of tube for which the grids are specified. Operations of the feed mechanism, groove cutters and the swaging means are so relatively coordinated as to skip locking-in the winding for a predetermined number of turns at regularly spaced intervals. Consequently, when the strips are cut into grid lengths, there are loose ends of the fine wire to be broken off thus leaving free of winding those end portions of the support rods which are to be used in securing the grids to the member on which they are mounted.

For convenience and economy, and to reduce handling of the grids to a minimum, the cutting device is usually associated with the winding lathe in such manner that the operator of the lathe may, while a strip is being automatically wound, cut a previously wound strip into grid lengths, break off loose ends of the fine wire and place the grids into individual compartments of a suitable tray in which they are transferred to another operator for further operations. All of this work requires considerable dexterity and close application on the part of operator, especially if the lathe is to be kept running at full capacity.

The machine available to the lathe operator for dividing the grid strips into individual grids, in the prior art, has a horizontal guide along which the strip is fed manually against a stop spaced from an appropriately formed and cyclically operated cutter.

An object of my invention is to improve the present type of grid cutter by providing for automatic feed of the grid strip. The grid structure is delicate and requires careful handling to avoid deformation. According to the present invention, a vertical chute is provided with a stop adjustably positioned below a set of cutters, and the feed is effected by gravity.

In any expeditious feeding arrangement involving an end stop there is the probability that the strip will rebound from the stop. Another object of the invention is to insure the severing of accurate lengths despite this tendency of the strip to rebound. The machine according to the present invention incorporates a control over the severing mechanism whereby a definite time delay is provided during which the feed means may overcome the chatter of the work and force it accurately against the feed stop.

The grid strip ordinarily has a pair of side wires of equal length, whereas the projecting side wires of the first and all subsequent severed grids may be required to be of unequal length. The cutters of the prior art machine as well as that of the present machine are properly shaped for this purpose, but the prior art machine wasted one grid-length of each strip, and required care in separating the first-severed and consequently inaccurately formed grid from the subsequently severed grids. Accordingly, a further object of the present invention is to minimize this difficulty and the waste entailed in the first trimming operation. The present machine provides a second work stop in advance of the first stop for the trimming cut, which stop is automatically removed from the work path after the first cutting operation on each strip. Since the trimmed waste is shorter than the grids, its separation from the grids is a simple matter.

An additional object is to provide a cutting machine of this class which shall be controlled by the material to be cut. A more general object is to provide a simple, accurate and essentially automatic cutting machine for grid strips and the like.

To these and other ends relating more particularly to details of construction, the invention consists of certain parts and combinations of parts as will be fully set forth in the following description and particularly defined in the appended claims.

The accompanying drawings illustrating the invention and forming a part of the specification are as follows:

Fig. 3 is a sectional view on line 3—3 of Fig. 1,

Fig. 4 is a diagram of the electrical connections.

Figs. 5 and 6 are end and face views, greatly enlarged, of a fragmentary portion of a grid strip.

Fig. 7 shows the apparatus in rear elevation, with its casing removed,

Figs. 8 and 9 are end face views from the left of the upper and lower cutting knives seen at the right of the grid strip in Fig. 10, the grid strip being shown in Fig. 8 as in position for a first or preliminary cut, and in Fig. 9 as having a grid in position to be severed.

Fig. 10 is a side view of the opposing cutting knives with the grid strip between them.

Fig. 11 is a bottom plan view of the knives and grid strip seen in Fig. 10, and Fig. 12 is a view in front elevation of one of the grids.

In the drawings similar reference numerals refer to similar parts throughout the several views.

Figure 1:
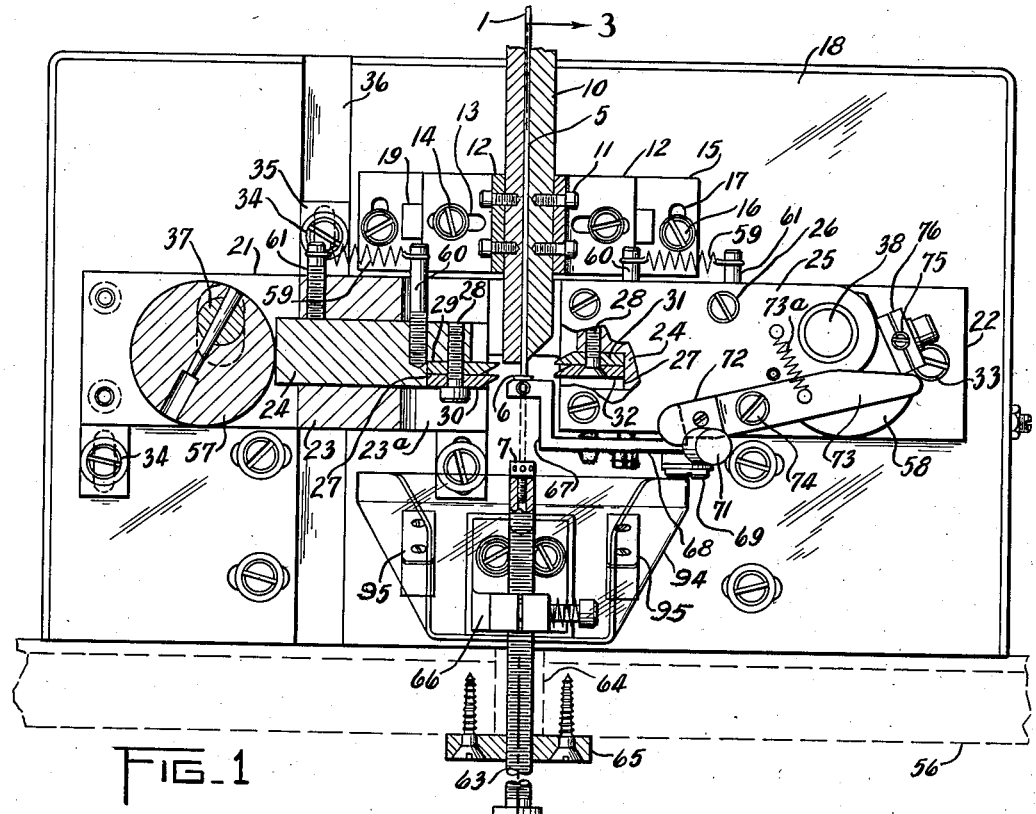
Fig. 1 is a view of the apparatus partly in front elevation and partly in vertical section on line 1—1 of Fig. 2.

The product of a grid winding lathe is a strip 1 about twelve inches long, such strips 1 being subsequently cut into grids of predetermined length. This operation has heretofore been done by the operator of the lathe, while one strip is being wound, placing a completed strip on a horizontally arranged guide, feeding it manually against a stop and then intermittently against the stop after each succeeding actuation of the cutting knives. One objection to this method of cutting the strip, other than that of requiring the constant attention of the operator and, in some instances necessitating speed reduction of the lathe, is the human element involved which does not always assure a positive feeding of the strip 1 against the stop, thus resulting in a variation in the lengths of the grids beyond permissible limitation and cumulative error with respect to the grid wires which are not swaged to the side rods.

In the present invention the grid strip is placed endwise in a guide and allowed to drop by gravity, first upon a manually set stop which, after a preliminary cut has been automatically made to even the ends of the support rods of the strip, is automatically moved out of line, whereupon the strip drops against a lower stop fixed in a position of adjustment with respect to the cutters which predetermines the length of the grids to be severed from the strip. Both of said stops are terminals in an electric circuit which is closed through the grid strip as a switch or connector means. Closing the circuit actuates the cutting mechanism and this occurs intermittently as, after each cutting operation, the progressively decreasing in length grid strip drops by gravity the set distance. The grids cut from a strip are of uniform length and action of the cutters is fast and positive, the latter being assured because of provision made in timing mechanism, included in the electrical connections, which delays operation of the cutters until the grid has come to rest upon the stop after any possible rebound therefrom.

Referring to Figs. 5, 6, and 8 through 12, a grid strip 1 is shown as comprising a continuous fine wire 2 wound as an open spiral around a pair of spaced, parallel and comparatively heavy support wires 3, the latter being grooved at 4 in the winding lathe to receive the successive convolutions of wire 2 following which the alternating ridges are peened over to secure the wire 2 in place. At regularly spaced intervals, however, the winding 2 is left loose on the supports 3 for a short distance and it is at such spaces that the cuts in the strip are made.

A grid strip 1 is inserted endwise into the open upper end of a vertically extending channel 5 and drops by gravity onto a first stop 6 which is movable into and out of operative position. The cutters, later to be described, then sever that portion indicated in dotted lines, Fig. 8, and which is represented by dimension A of Fig. 6, dimension B in turn representing the length of a space on the support wires 3 on which the winding 2 is loose. Movement of stop 6 to inoperative position which is practically simultaneous with the cutting operation, permits the strip 1 to drop onto a lower stop 7, as indicated in Figs. 1 and 9, the succeeding operations of the cutters severing one of the wires 3 at two places, as indicated at both extremities of the dotted portion seen at 8 in Fig. 9 and the other wire 3 at one place so that this second wire in the grid is the longer of the two. As the cutters move to inoperative position the severed grid drops away, the grid strip again drops by gravity onto the stop 7 and the operation is repeated. The operator manually removes any remaining loose ends of winding 2 from the severed units so that the completed grids are as illustrated at 1a in Fig. 12, the unwound end portions of the grids permitting the attachment thereto of supporting members.

Construction and operation of the apparatus is as follows:

The channel 5 in which the strips 1 are loosely guided, is rectangular, large enough to accommodate strips of various sizes, that is, within reasonable limits, and is formed by longitudinally extending slots milled in the opposing faces of two bars which by screws 9 are secured together to form a guide post 10, the upper end of the channel preferably being bell-mounted to facilitate insertion of the strips 1. The guide post 10 extends vertically and by screws 11 engaging through horizontally disposed slots 11a in the forwardly projecting spaced arms of a pair of angle brackets 12 is clamped to and between such arms for adjustment in or out, that is to the left or right with respect to Fig. 3.

The other arms of brackets 12, at right angles to those tied to the post 10 by screws 11, extend in opposite directions and are slotted at 13 to receive screws 14 whereby they are clamped as a unit for lateral adjustment to a plate 15 which, by screws 16 engaging through vertical slots 17 therein, is secured for vertical adjustment against the front face of an upstanding base plate 18. The brackets 12 are splined to plate 15 by a key 19 and likewise plate 15 is splined to the base 18 by a vertically disposed key 20 illustrated in Fig. 3. From the foregoing it will be observed that the guide post 10 through its supporting members is adjustable vertically and also in a horizontal plane both right and left, with respect to Fig. 1, and forward and back horizontally at right angles to such other lateral movement, as illustrated in Fig. 3.

To the left and right (Fig. 1) of the guide post 10 are longitudinally extending bearing members 21 and 22, respectively, each formed for a portion of its length from the inner end with a projecting block or body portion 23 having a channel throughout its length for receiving a slide 24. These slides 24 are guided in their respective channels for reciprocating movement and removably held in place by cover plates 25 secured to the block portions 23 by screws 26.

The slides 24 are undercut at their opposing ends to receive the cutters and provide abutting shoulders 27 therefor. In this instance the cutters on each slide are two superimposed flat, rectangular blades secured to the slide by a screw 28, the cutters for the left hand slide, Fig. 1, being indicated by the numerals 29 and 30 and those for the right hand slide by numerals 31 and 32. The two sets of cutters are reversed, with respect to each other, so that the knife edges of one set are at the top and those of the other set at the bottom of the blades, thus providing for a shearing cut of the wires 3. In the illustrated embodiment of the invention the two blades on each side, with their knife edges spaced apart, are provided in order that one leg on the grids 1a will be longer than the other. To this end the lower blades of each set, as shown in Figs. 8, 9, 10, and 11, have a portion of their knife edges cut away. Thus during each operative movement of the slides 24 one side wire 3 of the grid strip will be cut in one place and the other wire 3 will be cut in two places, the cut out portion 8 of the second wire becoming waste and this wire then being the shorter of the two in each grid.

For the purpose of providing adjustment of the two sets of blades so as to obtain proper shearing action of their knife edges, the supporting members 21 and 22 are made relatively adjustable. These members are supported upon the front face of the base plate 18, the member 22 being fixed in place by screws 33 while the openings in the member 21 for receiving its clamping screws 34 are elongated, permitting vertical adjustment of such member which, in addition, is splined to the base through a key 35 forming a fixed part thereof and engaging in a key slot 36 in the base.

The outer extensions of the slide supporting members 21 and 22, with the corresponding extensions of the cover plates 25 provide spaced bearings in which shafts 37 and 38, respectively, are rotatably mounted. These shafts extend through suitable openings in the base 18 and pinned to shaft 37 is an angularly disposed crank 39 which extends upwardly and inwardly from the vertical, with respect to Fig. 7, while pinned to the shaft 38 is an angularly disposed crank 40 extending downwardly and outwardly from the vertical. The outer ends of the cranks 39 and 40 are connected through a mechanism comprising a diagonally disposed rod 41, a fixed head 42 on one end of which has pivotal connection at 43 with crank 40, while a swivel sleeve 44, adjustable on the other end and clamped between adjusting nuts 45 and 46, has pivotal connection at 47 intermediate its ends with the crank 39.

Also pivoted to the connection 43 is one end of a link 48 which at its other end is pivoted at 49 to the outer end of the plunger 50 of an electromagnet 51 the supporting frame 52 of which is fastened by screws to the rear face of the base 18. Spacing sleeves 53 are provided on the crank shafts 37 and 38 between the cranks and the base 18, and integral with the latter adjacent its end edges are rearwardly extending supporting brackets 54 which by suitable fastening devices, as the screws 55, secure the base to a table top 56 upon which it is mounted. While magnet 51 is not energized, spring 40a maintains the linkage in the configuration shown, by urging crank 40 against stop 40b.

Fixed to the shafts 37 and 38 in the spaces between their respective bearings are like but opposing cams 57 and 58 which are in wiping contact with the outer end faces of the slides 24, the latter being yieldingly held in such contact by a pair of coiled tension springs 59, each spring being anchored at one end to a stud 60 upstanding from a slide 24 and at its other end to a stud 61 in the respective fixed guide body 23, the parts 23 being slotted at 23a to permit movement of the anchor studs 60 and heads of the blade holding screws 28.

The lower stop 7 upon which the grid strip 1 drops is shown as the head of a capstan screw, preferably of brass, threaded axially into the upper end of an adjusting screw 63 aligned with the channel 5. This screw 63 extends upwardly through an opening 64 in the table top and is threaded through an electrically insulated fixed bearing 65 on the under side of the table. A split clamp 66 locks the screw 63 in any desired position of adjustment and is secured by screw 62 to the base 18 from which it is electrically insulated, as shown in Fig. 3.

Figure 2:
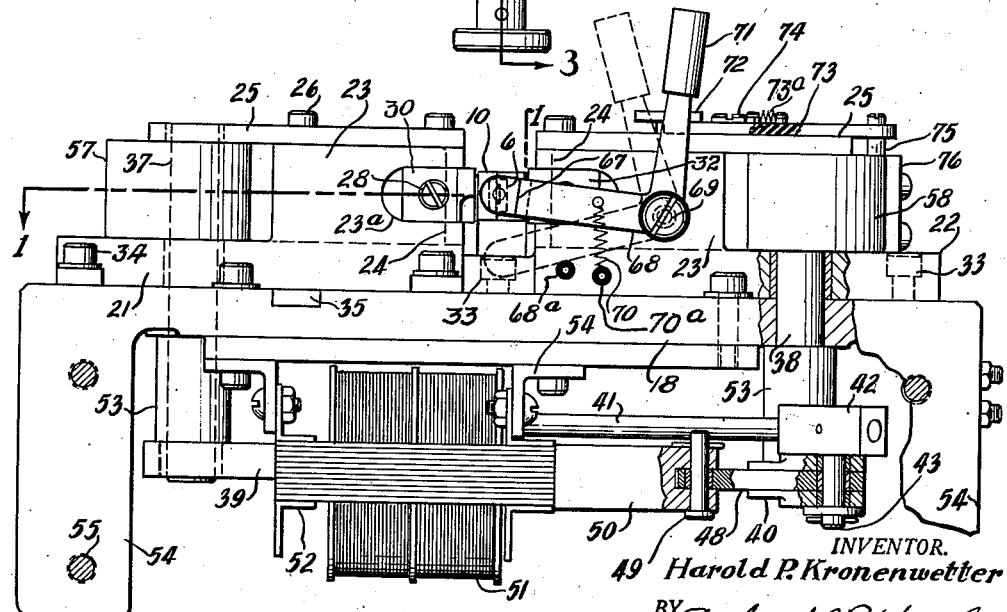
Fig. 2 is a view from the underside with the stop screw and associated parts removed in order to show the cutting mechanism more clearly.

Adapted to be swung into alignment with the stop 7 and channel 5, in substantially the plane of the lower knife edges of the cutters, is the upper stop 6 which is a brass insert (having a flexible circuit connection, not shown) on the lateral extension of an upstanding projection 67 formed on the free end of one arm of a two-armed horizontally disposed lever 68 pivoted at 69 to the under face of the guide support 22 and from which it also is electrically insulated. The lever 68 is tensioned toward insulated stop 68a by means of a coiled spring 70 which is anchored about insulated pin 70a. Stop 6 is moved into operative position by manually engaging the finger piece 71 on the other arm of lever 68 and swinging it to the right (Figs. 1 and 2) where the arm is engaged by a detent formed on the nose piece 72 adjustably secured to one end of a lever 73 of Bakelite or like material which is retractable by spring 73a and pivoted intermediate its ends at 74 to the adjacent slide cover 25. The tripping of lever 73 to release lever 68 and permit return of the latter to inoperative position, in which it is shown in dotted lines, Fig. 2, is accomplished by a stud 75 adapted to engage the other end of the lever and carried by a clamp 76 secured to a flattened portion of cam 58.

In Fig. 4 there is shown the wiring diagram of a timer 78 by means of which the grid strip which is to be successively cut after a time delay controls the energization of electromagnet 51. The timer functions to insure a sufficient lapse of time to allow the grid strip to come to rest against contact 6, or against contact 7 after a given strip has once been severed. A preferred form of timer includes cams 80 and 84 which are driven through reduction gearing (not shown) by A.-C. motor 82. Electromagnet 51 is energized from an A.-C. source through leads 81 and 83 when contacts 80a are closed toward the end of the timing cycle. Cam 84 operates contacts 84a, 84b, and 84c. With the machine at rest, as when no grids are to be cut, contacts 86a of relay 86 are closed to complete a direct current braking circuit for motor 82 to D.-C. source 88 through contacts 84b, 86a, and 84c in succession.

A low voltage circuit is provided whereby a grid strip between guide 10 and contact 6 or 7 may energize low-voltage relay 92, and with the closing of contacts 92a, relay 86 is energized. This low voltage circuit is energized by the secondary of transformer 90 which is connected at its primary to power leads 81 and 83. When the operator inserts a long strip of grid material to complete the circuit and energize relays 86 and 92, contacts 86a are opened and contacts 86b of relay 86 are closed. This interrupts the direct current braking circuit described above and completes an alternating current circuit for motor 82 from power lead 83 through contacts 86b, contacts 84b, and through the motor to the other power lead 81. Rotation of the motor, thus commenced, continues under control of the inserted grid strip until cam 84 permits its contacts 84b to open and close contacts 84a. Thereafter energization of motor 82 is independent of the grid strip, which may be severed during the motor cycle without preventing it from going to completion. While the grid strip is being cut, relay 86 may be deenergized, but motor 82 is still energized from the A.-C. source to complete the cycle.

It is necessary to prevent the D.-C. braking circuit from being applied to motor 82 at the same time that the motor is being driven. For this reason contacts 84c are arranged to be open at the time that contacts 84a are closed. When either relay 86 or cam 84 causes A.-C. energization of motor 82, the direct current braking circuit is interrupted. As soon as both of the A.-C. motor control circuits are opened the braking circuit promptly becomes effective.

When one grid is severed the grid strips falls to complete the circuit from contact 7 to guide 10, etc. This will ordinarily be effective to continue motor operation even without application of the braking circuit.

Timing of the device is such that two grids are cut per second. These grids fall off the stop 7 onto a discharge chute 94 which in the drawings is shown as made of transparent material and secured by brackets 95 to the base 18. A suitable casing 96 for the mechanism mounted on the rear face of the base 18 is shown in Fig. 3.

What I claim is:

1. A cutting device comprising a vertical guide along which the work in strip form may be fed by gravity, a pair of stops spaced apart in the direction of feed by means of which the strip may be arrested preparatory to cutting, cutting means operable intermittently in response to the contact of said strip with said stop to sever a length of the strip as it is successively arrested, and means for automatically retracting the first stop from the path of the strip to expose the second stop after the first cutting operation, wherein said retracting means comprises a spring for urging said first stop into retracted position, a latch for retaining said first stop in the path of the strip, and common actuating means for tripping said latch and for actuating the cutter of said cutting means.

2. In a cutting device, a guide along which electrically conductive work in strip form may be fed endwise by gravity, a stop, cutters operating intermittently to successively sever portions from the bottom of the work strip as feeding movement is arrested by dropping of the strip onto said stop, an electric circuit including said stop and said guide and adapted to be closed through said work strip as a connector when successive portions thereof contact said stop, and means controlled by said circuit for actuating said cutters when said circuit is closed by said strip, said circuit including a timer functioning to provide a predetermined time delay between each initial contact of the work strip with said stop and the resultant operative movement of said cutters.

3. In a device for cutting grid strips and the like, a guide along which the strip may be fed endwise by gravity, a first stop which is manually set to an operative position and retractable by spring means to an ineffective position, a second stop arranged below said first stop, cutters operating to sever a portion from the bottom of the grid strip after feeding movement is arrested by dropping of the strip onto either of said stops, an electric circuit closed through said strip as a connector when the lower end of the strip contacts either of said stops, means for actuating said cutters, means operated electrically by the closing of said circuit to effect actuation of said cutters, a detent for locking said first named stop in effective position, and means carried by said cutter actuating means for releasing said detent during movement of said cutter actuating means.

4. In a device for cutting elongated strips of grid material, a guide having a vertically extending channel through which the strips may be fed intermittently endwise by gravity, a stop limiting such feeding movement by abutment with the lower end of the strip, spring retractable slides mounted for reciprocating movement transversely of the line of grid strip feed and on opposite sides of said guide, opposing cutters for shearing the strip and comprising blades carried by said slides, said cutters being arranged adjacent the discharge end of said guide with said stop being an electrical contact member spaced below said cutters and upon which the bottom end of the progressively shortening strip drops prior to each cutting operation, opposing cams engaging said slides to effect operative movement thereof, and electromechanical means for oscillating said cams, a grid strip when in contact with said stop becoming a connector in an electric circuit for energizing said electro-mechanical means.

5. The combination, in an apparatus for cutting elongated grid strips of the character described into grid lengths, of a frame part including a vertically arranged supporting surface, a vertically extending guide member attached to said frame part in spaced relation to said surface and having a channel extending longitudinally thereof, open to individually receive and discharge the strips and permitting them to drop therethrough by gravity, a stop spaced below said guide for arresting feed of the grid strips, strip cutting means operating transversely of said guide and arranged between the discharge end of said channel and said stop, the strip being in electrical contact with a wall of said guide when engaged by said stop, and an actuating circuit for said strip cutting means, said circuit being connected to said guide and to said stop.

6. The combination, in an apparatus for cutting elongated grid strips of the character described into grid lengths, of a frame part including a supporting surface in a vertical plane, a vertically extending guide in spaced relation to said supporting surface and along which the grid strips may be individually fed lengthwise by gravity, a stop spaced below said guide for arresting feed of the strips, bearing members attached to said supporting surface on opposite sides of said guide, opposing spring retractable slides guided for reciprocating movement in said bearing members, strip shearing cutters carried by said slides and operating intermediate said guide and said stop, a shaft journalled in each of said bearing members, electrically operated means for effecting simultaneous rotary movement of said shafts in opposite directions and means for effecting the operative movement of said cutter carrying slides comprising opposing cams fixed to said shafts and in rolling contact with said slides, said stop and said guide being electric terminals of a control circuit for said shaft rotating means adapted to be bridged by a grid strip when resting on said stop.

7. In a grid cutting device, a frame part including a vertically arranged supporting surface, a vertically extending guide in spaced relation to said supporting surface and along which the grid strips may be individually fed by gravity, a stop for arresting feed of the grid strips and spaced below said guide, a bearing member attached to said supporting surface, a spring retractable slide guided for reciprocating movement in said bearing member transversely of said guide, a cutter carried by said slide and movable in a horizontal plane adjacent the bottom end of said guide, a shaft journalled in said bearing member and means for oscillating said shaft, a cam on said shaft for effecting operative movement of said slide, a two-armed lever pivotally supported with relation to said frame part, an intermediate stop on one arm of said lever movable into an operative position in the line of the strip feed intermediate said cutter and said first named stop, said lever being manually movable into operative position and spring retractable to its inoperative position, a detent engaging the other arm of said lever to hold the lever in operative position, and means carried by said cam for releasing said detent.

8. The combination, in an apparatus for cutting grid strips of the character described into grid lengths, of an upstanding base plate, a substantially vertical guide supported by and in spaced relation to said base plate and along which the grid strips may be individually fed by gravity, an adjustable screw aligned with said guide, a stop on the end of said screw for arresting feed of the grid strips and electrically insulated from said plate, bearing members carried by said plate on opposite sides of said guide, slides guided for reciprocating movement in said bearing members transversely of said guide, a shaft journalled in each of said bearing members and extending through said plate, opposing cams fixed to said shafts and each engaging a respective one of said slides to effect operative movement of the slide, spring means for retracting said slides, opposing cutters for shearing the strip intermediate said stop and said guide and carried by said slides, a discharge chute upon which grids cut from the strip are permitted to fall by gravity from said stop, a crank fixed to each of said shafts on the side of said base plate opposite said guide and said cutters, a link connecting said cranks, one above and the other below the centers of said shafts, an electromagnet having an armature, a link connecting the armature and one of said cranks, a timer, and circuit connections through said timer and said solenoid, said timer being controlled by the grid strip as a connector between said stop and a wall of said guide and operating to effect the intermittent energizing of said electromagnet.

9. A cutting device including a vertical guide along which a work strip may be fed by gravity, a cutter for severing a length of said strip, a stop located beyond said cutter and against which said strip is arrested, the spacing between said cutter and said stop determining the severed length of said strip, means for operating said cutter controlled by engagement of said strip with said stop, and means for delaying said cutter operating means for a predetermined period of time after engagement of said strip with said stop.

HAROLD P. KRONENWETTER.

REFERENCES CITED

The following references are of record in the file of this patent:

UNITED STATES PATENTS

| Number | Name | Date |
|---|---|---|
| 129,273 | Peeman | July 16, 1872 |
| 425,846 | Atha | Apr. 15, 1890 |
| 1,083,484 | Duggan | Jan. 6, 1914 |
| 1,283,976 | Tracy et al. | Nov. 5, 1918 |
| 1,407,712 | Stevens et al. | Feb. 28, 1922 |
| 1,814,586 | Crosby | July 14, 1931 |
| 1,826,016 | Naylor et al. | Oct. 6, 1931 |
| 1,883,047 | Spire | Oct. 18, 1932 |
| 2,069,424 | Seft | Feb. 2, 1937 |
| 2,341,011 | Bascom et al. | Feb. 8, 1944 |
| 2,392,870 | Whipple | Jan. 15, 1946 |